United States Patent
Brawn et al.

(10) Patent No.: US 6,918,103 B2
(45) Date of Patent: Jul. 12, 2005

(54) INTEGRATED CIRCUIT CONFIGURATION

(75) Inventors: Jonathan William Brawn, Burwell (GB); James Roy Alphey, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/984,013

(22) Filed: Oct. 26, 2001

(65) Prior Publication Data

US 2002/0059556 A1 May 16, 2002

(30) Foreign Application Priority Data

Oct. 31, 2000 (GB) .............................................. 0026596

(51) Int. Cl.$^7$ .......................... G06F 17/50; G06F 19/00; G06F 9/445
(52) U.S. Cl. .............................. 716/18; 716/16; 713/2; 713/100; 713/193
(58) Field of Search ........................ 716/18, 16; 713/2, 713/100, 193

(56) References Cited

U.S. PATENT DOCUMENTS

| 5,473,546 A | | 12/1995 | Filseth | |
|---|---|---|---|---|
| 5,745,734 A | * | 4/1998 | Craft et al. .................... | 716/16 |
| 5,883,814 A | | 3/1999 | Luk et al. | |
| 5,970,142 A | * | 10/1999 | Erickson ..................... | 713/189 |
| 6,028,445 A | * | 2/2000 | Lawman ...................... | 326/38 |
| 6,216,258 B1 | * | 4/2001 | Mohan et al. ................. | 716/17 |
| 6,272,669 B1 | * | 8/2001 | Anderson et al. ............. | 716/16 |
| 6,305,005 B1 | * | 10/2001 | Burnham ..................... | 716/16 |
| 6,438,737 B1 | * | 8/2002 | Morelli et al. ................ | 716/16 |
| 6,438,738 B1 | * | 8/2002 | Elayda .......................... | 716/16 |
| 6,487,648 B1 | * | 11/2002 | Hassoun ...................... | 711/167 |
| 6,510,546 B1 | * | 1/2003 | Blodget ........................ | 716/16 |
| 6,526,558 B2 | * | 2/2003 | Agrawal et al. .............. | 716/16 |
| 6,557,156 B1 | * | 4/2003 | Guccione ...................... | 716/17 |
| 6,571,381 B1 | * | 5/2003 | Vorbach et al. ............... | 716/16 |
| 6,584,601 B1 | * | 6/2003 | Kodosky et al. ............... | 716/4 |
| 6,769,109 B2 | * | 7/2004 | Osann, Jr. et al. ............ | 716/17 |
| 2001/0034876 A1 | * | 10/2001 | Panchul et al. ............... | 716/18 |
| 2001/0037458 A1 | * | 11/2001 | Kean .......................... | 713/193 |
| 2001/0047509 A1 | * | 11/2001 | Mason et al. ................. | 716/18 |
| 2003/0005292 A1 | * | 1/2003 | Matthews .................... | 713/160 |
| 2004/0133793 A1 | * | 7/2004 | Ginter et al. ............... | 713/193 |

FOREIGN PATENT DOCUMENTS

| GB | 2 203 869 | 10/1988 | ........... G06F/11/30 |
|---|---|---|---|
| GB | 2 230 362 | 10/1990 | ............ G06F/1/00 |
| GB | 2 270 176 | 3/1994 | ........... G06F/9/445 |
| GB | 2346236 | 10/1998 | ........... G06G/9/44 |
| JP | 09282350 | 10/1997 | ........... G06F/17/50 |
| JP | 11085824 | 3/1999 | ........... G06F/17/50 |
| WO | WO 95/17714 | 6/1995 | .......... G06G/9/445 |
| WO | WO 99/14636 | 3/1999 | ............ G03F/9/00 |

OTHER PUBLICATIONS

Zhu et al., "Hardware compilation for FPGA-based configurable computing machines", Proceedings of 1999 Design Automatio Conference, Jun. 21, 1999, pp. 697–702.*

(Continued)

*Primary Examiner*—A. M. Thompson
*Assistant Examiner*—Phallaka Kik
(74) *Attorney, Agent, or Firm*—Nixon & Vanderhye P.C.

(57) ABSTRACT

An integrated circuit containing a plurality of data processing circuit elements 4, 6, 8, 10, 12, 14 and 16 is provided with a configuration data memory 12. Upon initialisation of the integrated circuit 2, configuration data is read from the configuration data memory 12 and used to set up configuration program software 26 that controls the interaction between application program software 18, 20, 22 and the integrated circuit 2. The configuration data is automatically formed from a human readable hierarchical description of the integrated circuit 2 in the form of an ASN.1 description.

5 Claims, 6 Drawing Sheets

OTHER PUBLICATIONS

Erdogan et al., "VHDL modeling and simulation of the back-propagation algorithm and its mapping to the RM", Proceedings of the IEEE 1993 Custom Integrated Circuits Conference, May 9, 1993, pp. 3.3.1–3.3.4.*

Akella et al., "SHILPA: a high-level synthesis system for self-timed circuits", 1992 IEEE/ACM International Conference on Computer-Aided Design, Nov. 8, 1992, pp. 587–591.*

Darby, "ASIC and FPGA design challenge", IEE Colloquium on the Teaching of Digital Systems, May 18, 1998, pp. 1/1–1/3.*

Yip et al., "Partial-encryption technique for intellual property protection of FPGA-based products", IEEE Transactions on Consumer Electronics, vol. 46, No. 1, Feb. 2000, pp. 183–190.*

* cited by examiner

INTEGRATED CIRCUIT CONFIGURATION

BACKGROUND OF THE INVENTION

1. Field of the Invention

This invention relates to integrated circuits. More particularly, this invention relates to integrated circuits including a plurality of data processing circuit elements having a variable configuration.

2. Description of the Prior Art

The trend towards higher levels of integration within data processing systems has led to many more data processing circuit elements being included on a single integrated circuit. For example, so called system-on-a-chip integrated circuits may typically include a processor core, on-chip memory, several peripheral devices, timers and the like such that few additional components are required outside of the integrated circuit to make a functioning device. It will be appreciated that there are many possibilities for different data processing circuit elements that may be included within a single integrated circuit and that these data processing data elements may be configured in a variety of different manners to suit the particular device being produced.

At the same time as the trend towards system-on-a-chip designs, there is also a strong desire to reduce the development time for new devices. A significant amount of time in the development of a new device may be expended in writing and testing software, such as, for example, BIOS software, that controls the low-level interaction between the various hardware elements with the specific parameters of a particular system-on-a-chip design. It will be further appreciated that if a mistake is made in the way in which an integrated circuit is configured for manufacture, then this can be extremely expensive to rectify.

SUMMARY OF THE INVENTION

Viewed from one aspect the present invention provides an integrated circuit comprising:

(i) a plurality of data processing circuit elements;

(ii) a configuration memory storing configuration data describing said plurality of data processing elements; and (iii) configuration logic operable upon initialisation of said apparatus to read said configuration data from said configuration memory and to determine therefrom configuration parameters of said integrated circuit for setting up configuration program software controlling interaction between application program software and said plurality of data processing circuit elements.

The invention recognises that there are considerable advantages to be gained by storing configuration data within the integrated circuit hardware itself and having the system use this data to set up the interaction between the hardware and application software when the integrated circuit is initialised. The configuration program software, such as BIOS software, can be generic over a wide variety of integrated circuit devices whilst setting up the particular configuration of a device upon which it is to operate from the configuration memory of that device. This considerably reduces the development and testing time needed for the configuration program software to be used on each device and allows changes to be made to the configuration of the device in a much more straightforward manner.

It will be appreciated that the provision of the configuration memory within the integrated circuit runs counter to the technical prejudice within the integrated circuit field of reducing the circuit element and gate count of an integrated circuit as much as possible. However, the advantages of the present invention more than justify the increased gate count of providing such an on-chip configuration memory.

It will be appreciated that the divisions between the functionality provided by different software elements in a system are often not clear cut, but in many preferred embodiments of the invention the configuration program software is basic input/output system software.

Many system-on-a-chip devices include a processor core responsive to program instructions. Such devices have a high degree of flexibility in the operations they perform. Within such systems the configuration logic operable upon initialisation can be provided in the form of the processor core operating the control of initialisation program instructions. Whilst this may in practice be the most likely way in which the configuration logic is embodied, it would also be possible to provide special purpose hardware to form the configuration logic.

It will be appreciated that the configuration data can take a very wide range of forms and include a wide range of levels of detail. However, particularly preferred data useful in establishing the operation of the integrated circuit is as follows:

Data identifying a processor core

Data identifying type, manufacturer or variant of a system component

Data controlling a Memory Management Unit

Data identifying a type of data memory present

A capacity value of a data memory present

A page size of a data memory present

Access parameters for all or parts of a data memory present

A memory address associated with a data processing peripheral circuit

An interrupt associated with a data processing peripheral circuit

An indication of whether a library of software of routines is present, and

Data heap configuration data for such software routines

The configuration memory could take a variety of forms. It could take the form of embedded special purpose circuit elements that may be read under software control. However, the configuration memory is preferably provided in the form of a more generic read only memory in which the configuration data is fixed at manufacture. Such an arrangement allows the configuration data to be more easily changed relatively late in the design of an integrated circuit.

In order to protect proprietary information regarding how a particular device is configured, it may be preferred that the configuration data is encrypted.

A further problem in developing system-on-a-chip designs is that individual minor variants of the configuration of the system can require considerable effort to be expended in modifying the software that will control that system. Furthermore, there are many different ways in which a highly integrated system may be documented and described which has the result that re-use of previously generated designs is made more difficult.

Viewed from another aspect the present invention claims a method of describing an integrated circuit having a plurality of circuit elements and associated configuration parameters, said method comprising the step of:

(i) generating a description of said integrated circuit using a predetermined hierarchical syntax to form a human readable hierarchical description.

The present invention recognises that by applying a rigorous methodology to the way in which an integrated circuit is described significant advantages may be realised. A human readable description formed in accordance with a predetermined hierarchical syntax allows the possibility for subsequent machine interpretation of that written description in a manner that may be used to automatically generate data or software for controlling the system. Thus, minor configuration changes may be made in the human readable description and these changes automatically interpreted (in a process analogous to program compilation) to form configuration data or controlling software for the system. In addition, the predetermined hierarchical syntax in which the integrated circuit is described makes the re-use of previously generated designs easier since another designer may more readily understand and appreciate the level of detail they require within a particular pre-existing design without having to search through a description in a individual form produced by a particular author.

It will be appreciated that the hierarchical form allows the possibility for multiple levels within the description with one or more dependent entries stemming from a higher order entry. The depth of the hierarchy may vary depending upon the particular path taken through the hierarchy.

A preferred entry form found to be well suited to the description of integrated circuits is one in which each entry specifies order, type and value for an entity at that level.

Viewed from another aspect the present invention provides a method of configuring an integrated circuit having a plurality of data processing circuit elements and a configuration memory storing configuration data describing said plurality of data processing elements, said method comprising the steps of:

(i) upon initialisation of said apparatus, reading said configuration data from said configuration memory;

(ii) determining from said configuration data configuration parameters of said integrated circuit for setting up configuration program software controlling interaction between application program software and said plurality of data processing circuit elements.

An alternative aspect of the present invention is a computer program storage medium bearing a computer program for controlling an integrated circuit to perform the above described techniques.

The human readable description of the system may also be used to control physical configuration of the system, such as controlling the layout or other physical parameters. Thus, a design flow may use the description to generate SoC (system on a chip) configuration files and the SoC tools to layout controlling data. The description data could also be passed to debug tools. By passing the SoC description to debug tools, those tools may access the physical SoC using standard mechanisms and then use the description to interpret, format and/or label returned values.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
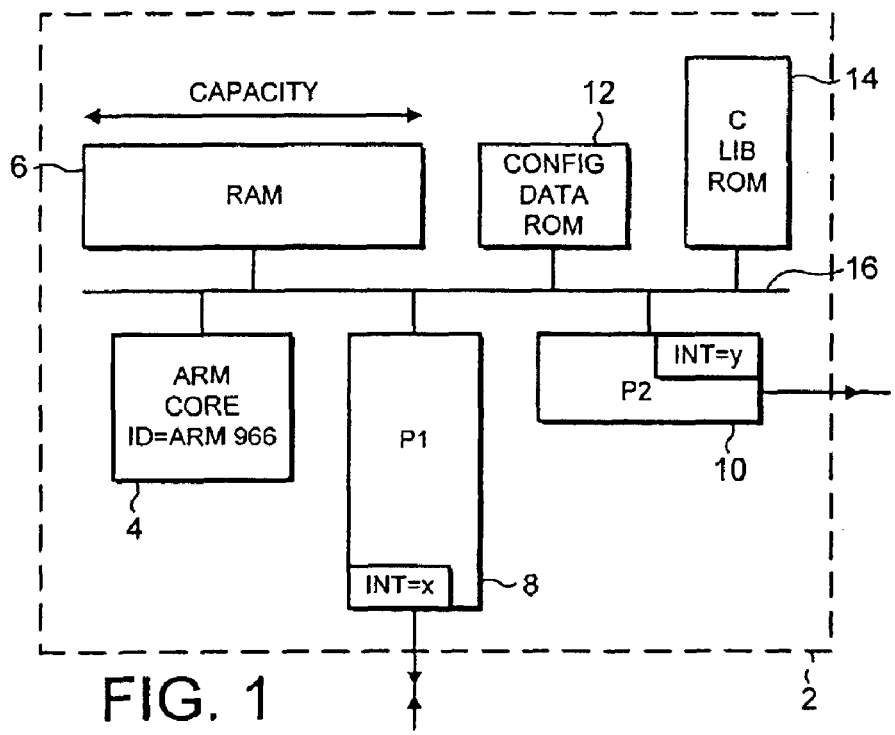
FIG. 1 schematically illustrates an integrated circuit including a plurality of data processing circuit elements.

FIG. 1 illustrates an integrated circuit 2 that is of a type referred to as a system-on-a-chip device. The integrated circuit 2 includes a processor core 4, a data memory 6, a first peripheral 8, a second peripheral 10, a configuration data memory 12 and a software subroutine library memory 14. These individual data processing circuit elements are all linked by a bus 16.

The processor core 4 has associated identifying data that is included within the configuration data stored in the configuration data memory 12. The data identifying the processor core may be useful in establishing which instruction set it is operating or which capabilities the processor core 4 has. The data memory 6 has associated configuration data indicating what type of memory it is (e.g. RAM, ROM, Flash, etc), as well as its storage capacity and page size. Memory management data may also be included within the configuration data indicating whether all or parts of the data memory 6 are cacheable, bufferable, and subject to read/write restrictions.

The first peripheral 8 and the second peripheral 10 give rise to configuration data within the configuration memory 12 identifying which peripheral they are, their configuration (such as interrupt data and memory address data) as well as other information required for the integrated circuit 2 to properly use the peripheral 8, 10. It will be appreciated that there is considerable flexibility in the number and type of the peripheral devices 8, 10 that may be provided within the integrated circuit 2 and that these peripheral devices 8, 10 may come from different suppliers and design sources, such that the ability to at least partially abstract their interaction with the other portions of the system into the configuration data is highly advantageous.

The software subroutine library memory 14 is indicated as present within the configuration data and configuration data is also included indicating the location and size of a data heap within the data memory 6 that can be used by the software subroutines in the library 14.

The configuration data memory 12 is shown in FIG. 1 in the form of a read only memory. Such a read only memory can be programmed with the necessary configuration data using standard techniques. Alternatively, special purpose circuit elements, such as registers that can be read, may be provided to store the configuration data. The configuration data can be encrypted using various known encryption techniques.

Figure 2:
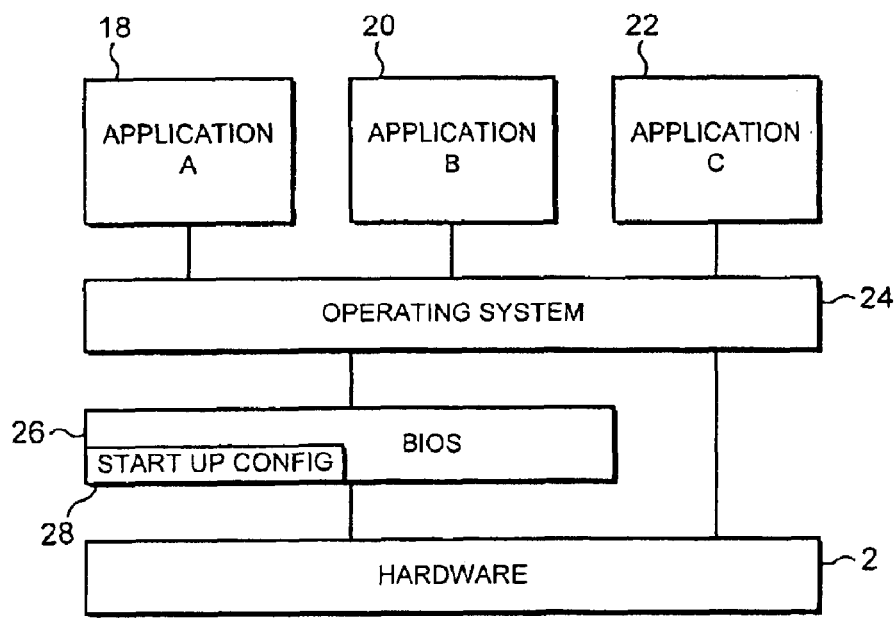
FIG. 2 schematically illustrates the relationship between software elements within a data processing system.

FIG. 2 schematically illustrates the relationship between software elements and the hardware within the example device. At the highest level the device may execute several application programs 18, 20, 22. These application programs 18, 20, 22 interact with the operating system 24. From the point of view of the application programs 18, 20, 22, the operating system 24 provides the function of interacting and controlling the various hardware elements of the device 2. The operating system 24 may communicate directly with the device 2 for some services, but a large number of services will be provided via a basic input/output system software layer 26. This basic input/output system software layer 26 allows for the possible use of a variety of different operating systems 24 for a given design of device 2.

The initialisation program instructions 28 that control the reading of the configuration data memory 12 and the setting up of the basic input/output system software 26 are embedded within the basic input/output system software 26 itself. When the device 2 is initialised (e.g. the power is switched on or the system is reset), then the initialisation program instructions are executed to read the configuration data from the configuration data memory 12 and set up appropriate parameters for the various data processing circuit elements of the device 2 in the basic input/output system software 26.

Figure 3:
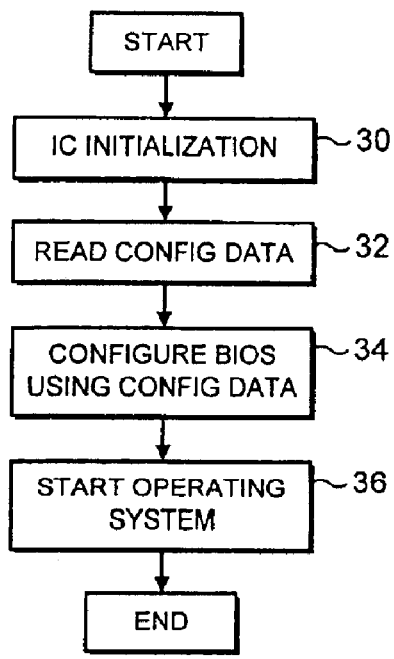
FIG. 3 is a flow-diagram illustrating the initialisation of an integrated circuit.

FIG. 3 is a flow-diagram illustrating the initialisation of the device 2. At step 30, the device 2 is initialised by the switching on of power or a hardware reset. At step 32, the configuration data from the configuration data memory 12 is read under control of the initialisation program 28. At step 34, the initialisation program 28 uses the configuration data it has read to configure the basic input/output system software 26 with the variable parameters of the data processing circuit elements indicated as being present within the device 2. At step 36, the initialisation of the device 2 has been completed and processing control is passed to the operating system 24. Alternatively, the configuration of the system may not be completed until after handover of control to the operating system.

Figure 4:
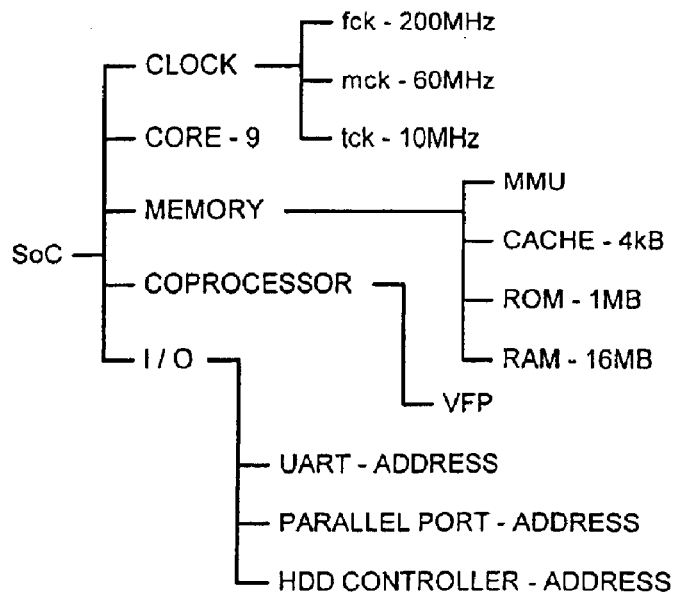
FIG. 4 illustrates a hierarchical description of an integrated circuit.

FIG. 4 illustrates a hierarchical description of an integrated circuit. In this example, an individual system-on-a-chip (SoC) system forms the highest level within the description. Beneath this highest level the components are first divided into the clock, microprocessor core, memory system, coprocessor and I/O systems. Some of the entries at this high level may not need to be further described and it is sufficient to associate type and value data with these entries in order to rigorously define the system. As an example, the core and coprocessor entries may be sufficiently defined by specifying the core as an ARM9 core and the coprocessor as a vector floating point unit. The design tools that will subsequently be responsive to this description do not need any further information regarding these particular entities other than that specified. Conversely, an entity such as the memory may be further divided into entities describing the presence or absence of an MMU (with associated parameters), a cache memory, a read only memory and a random access memory. Similarly, the I/O devices may be subdivided into individual types with their particular parameters such as address, interrupt and the like associated therewith. It will be appreciated that the description illustrated in FIG. 4 is highly simplified and that in reality many more entries and levels will be present within a typical system description with a fine level of detail regarding the configuration parameters.

Figure 5:
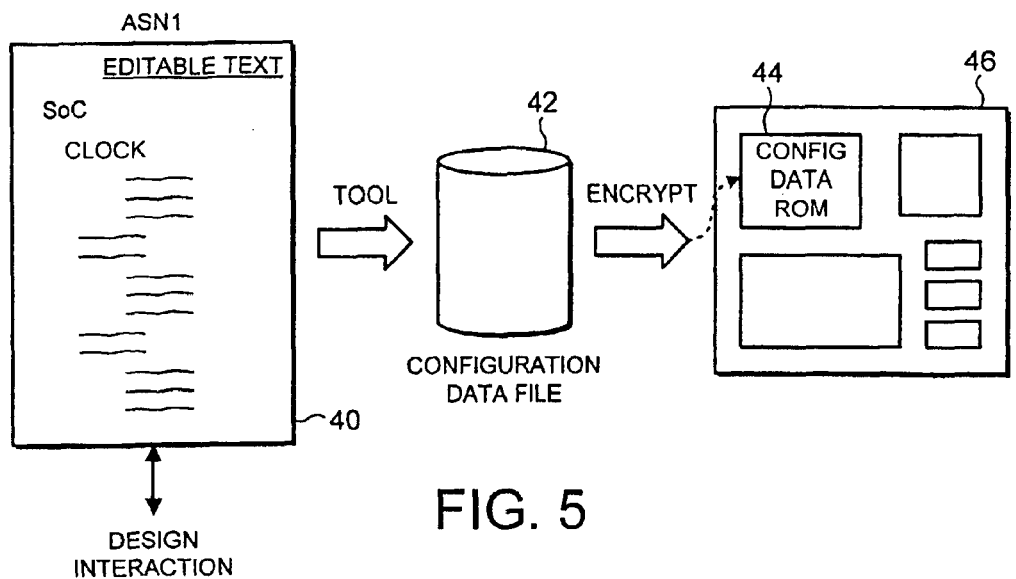
FIG. 5 illustrates a design process for an integrated circuit.

FIG. 5 schematically illustrates the design process using the hierarchical syntax. The human readable description 40 is in the form of an editable text file written in accordance with the ASN.1 syntax (it will be appreciated that other description formats, such as XML, could also be used). A designer can modify elements within this editable text simply using a standard text editor to alter the description of the system to suit a particular requirement. Once the editable text 40 has been finalised, a software tool may be used to interpret this description and generate a configuration data-file 42 representing in a compact form the configuration of the system. This configuration data may then be encrypted prior to being stored within the configuration data memory 44 of a system 46 to which it relates.

There follows a further description of a software system embodying one example of the present invention:

The BIOS (basic input/output system) is the program a microprocessor uses to get the computer started after you turn it on. It also manages the data flow between the computer's operating system and attached peripheral devices. [source—Intel]

Reduction of time-to-market can be a key feature of code development. It has been suggested that a reduction in code efficiency of 10% is acceptable when balanced against improved design flow.

SoC BIOS ('microBIOS') is an ARM solution to support peripheral input and output (I/O) and abstraction in a flexible manner, so simplifying portion between platforms and reducing time-to-market.

In many systems, driver code includes an encoding of aspects of the system in which the driver lies. By encoding system descriptions as data, rather than as code, SoC BIOS separates the system design and code implementation paths.

To allow poring to be performed with minimal changes to code, SoC BIOS incorporates a flexible mechanism for accessing a system description.

SoC BIOS supports abstraction of underlying hardware, such as core variants.

Track state and availability of peripherals is performed transparently by the BIOS.

SoC BIOS adds value with a number of run-time features for I/O support.

Terms and Abbreviations

This document uses the following terms and abbreviations.

| | |
|---|---|
| AFS | ARM Firmware Suite - a set of board-support components |
| API | Application Programmers Interface - the interface presented by SoC BIOS to the Implementor. |
| ASCII | Standard character encoding |
| ASN.1 | Abstract Syntax Notation One. Standard notation for specifying data structures at a high level of abstraction. |
| ATPCS | ARM/Thumb Procedure Calling Standard |
| BER | Basic Encoding Rules for ASN.1 |
| BIOS | Basic Input/Output system - code controlling initialisation and functionaiity of peripherals. |
| ELA | Expansion Link Address - location examined by the BIOS for extension information |
| GPI | Generic Peripheral Interface, used to perform peripheral control |
| ID | Abbreviation for 'Identifier' |
| Implementation | An application or OS utilising the SoC BIOS |
| Implementor | The individual writing a BIOS-aware implementation |
| I/O | Input and/or Output |
| MMU | Memory Management Unit |
| MOD | Generic identifier for a peripheral module |
| MPU | Memory Protection Unit |
| OS | Operating System |
| OSD | Operating System Device Driver Model |
| PDB | Peripheral Definition Block. This defines the peripherals to be supported. |
| PERSISTENT | Data which is maintained by the Implementation accross multiple calls to the BIOS |
| PIB | Peripheral Information Block. This specifies details of one peripheral. |
| RAM | Random Access (writeable) storage |
| ROM | Read Only (non-writeable) storage, generally included programmable (Flash) storage |
| ROPI | Read Only Position Independent code |
| RWPI | Read/Write Position Independent code |
| SIB | System Identification Block. A header of on-chip or on-board identification data. |
| SWI | Software Interrupt, also ARM processor Software Interrupt mode |

| | -continued |
|---|---|
| TBD | To Be Determined (incomplete area of specification) |
| μHAL | micro Hardware Abstraction Layer. A low-level abstraction library supplied as freeware by ARM with the Integrator demonstration system. Part of AFS. |

The objectives of the SoC BIOS software are to make it easier, faster and cheaper for customers to use ARM-based solutions. There is a growing understanding that the faster development time offered by generic code can balance any efficiency reduction. Within the automotive industry, an acceptable efficiency loss of 10% has been suggested if balanced by enhanced development speed.

SoC BIOS Offers the Following:

In many systems, driver code includes an encoding of aspects of the system in which the driver lies. By encoding system descriptions as data, rather than as code, SoC BIOS separates the system design and code implementation paths.

To allow porting to be performed with minimal changes to code, SoC BIOS incorporates a flexible mechanism for accessing a system description.

SoC BIOS supports abstraction of underlying hardware, such as core variants.

Track state and availability of peripherals is performed transparently by the BIOS.

SoC BIOS adds value with a number of run-time features for I/O support.

1. Supporting an RTOS

An high percentage of RTOS vendors support the ARM platform. We wish to ensure that this continues and furthermore that new ARM platforms, including changes in processor type, peripheral set and configuration, are supported quickly and reliably.

By abstracting the configuration and presenting a generalised peripheral model, SoC BIOS will simplify both porting and maintaining the RTOS on a range of platforms. For peripheral control, operating system compatible device drivers (OSDs) can be written to conform to the RTOS requirements and to interface through SoC BIOS with low-level physical device drivers.

2. With no RTOS

For those of ARM's customers who don't use an RTOS, the SoC BIOS feature set is designed to function as a stand-alone BIOS, offering a complete package for initialisation and control. The high-level abstracted model is intended to reduce design time for an application designer.

SoC BIOS Supplies a Number of Features to Simplify Porting.

Platform independence—SoC BIOS offers a configured and stable platform to the application. This reduces the need for the application to communicate directly with the underlying hardware or to support hardware variants.

Peripheral identification—SoC BIOS will track the peripherals in the board specification and initialise them. Changes in board design therefore require less redesign of code.

Although AFS and SoC BIOS both present a layer of abstraction to an application, there are several differences in target and scope between the two products. The differences are:

SoC BIOS will offer a higher level of functionality than AFS, both by including further high level functions and by reducing the need for the application to access the system at a very low level.

SoC BIOS will include an interface for generic control of system peripherals, while AFS offers support for the specific functions known to be generally available on development boards.

SoC BIOS will be a separate entity, resident on-board or on-chip, rather than a library of control functions. System details are separately specified by the system designer and interpreted at run-time. The application then interacts with SoC BIOS at run-time in a DLL-like manner. This simplifies the design path and helps to ensure that the encoded configuration matches the actual system.

All Primecell drivers will be extended to be compatible with the SoC BIOS Generic Peripheral Interface (see below). This will be by addition of a GPI layer to each driver, and does not preclude the use of these peripherals in isolation. Any peripheral driver may be built into the SoC BIOS and its API will then be available. However, to be integrated within SoC BIOS, the driver must be extended to at least the most basic functions of the Generic Peripheral Interface (see below).

The SoC BIOS build will be designed initially to be built with ADS (ARM Developer Suite). It is intended that the project code will eventually be compatible with other development environments (at least GNU tools), but the first release will be for ADS only.

The SoC BIOS project will conform to the Software Systems coding standard and will be assigned project identifier ab.

Development with SoC BIOS

SoC BIOS separates the process of specifying the target system from the writing of code, and separates BIOS code from application (or RTOS) code. This gives defined areas of development, which are usually addressed by developers with different skills and knowledge.

Figure 6:
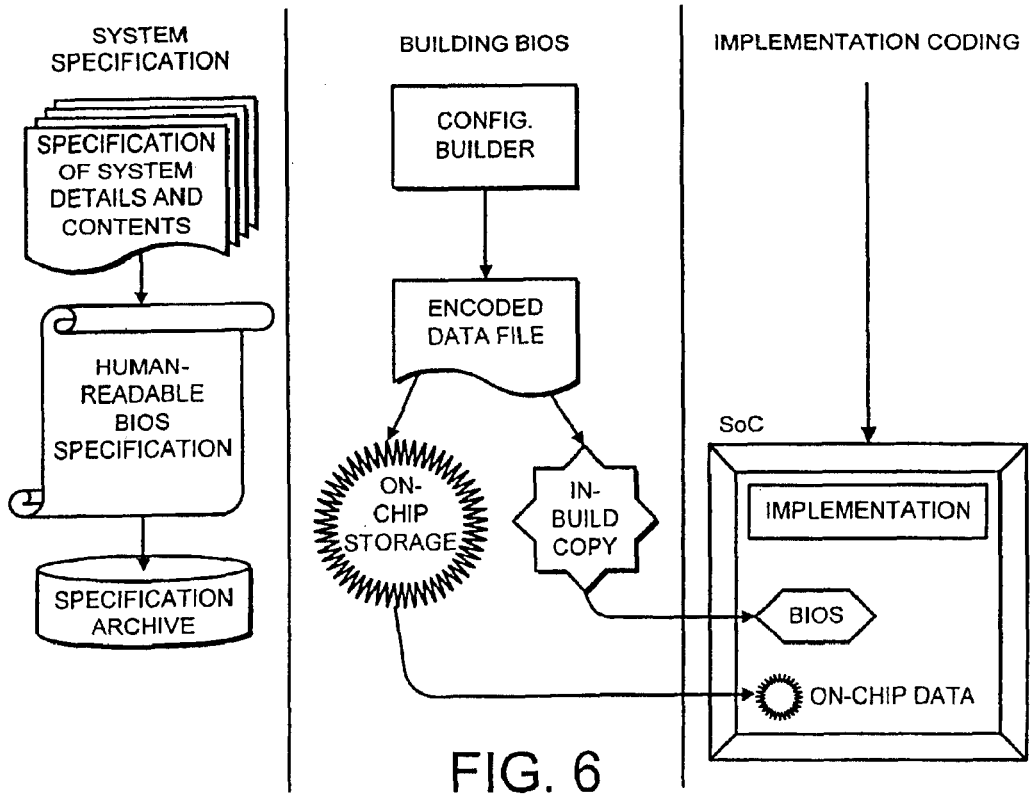
FIGS. 6 to 12 illustrate further features of one example embodiment of the invention.

See FIG. 6—SoC BIOS Development Process

The system description is an encoded specification of the system and peripherals. It is encoded as a block of data whose format is defined as an ASN.1 abstract syntax structure. This is a formal definition of the structure format and types. The associated value notation is used to present the system description in a human-readable form. The specification data is bound as closely as possible to the system that it describes. It may be available directly from the system (on-chip or in non-volatile memory), but in the absence of this data, an in-build copy (encoded as part of the build procedure) will be used.

BIOS Structure

An overview of the SoC BIOS structure is shown below (BIOS functionality is shown as 3-D boxes). The API sit over a number of run-time modules. System configuration draws in data from a range of sources to configure peripherals through the GPI. The implementation communicates with the peripherals through the GPI, or directly through the driver API where required.

Figure 7:
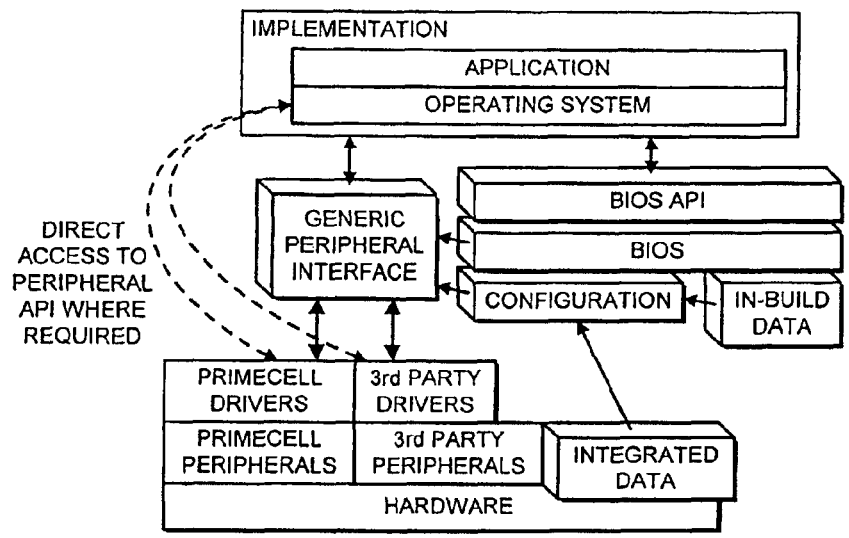

See FIG 7—SoC BIOS Overview

The SoC BIOS is split into several parts.

3.

This contains the basic SoC BIOS code to initialise the system, handle interrupts and control the Generic Peripheral Interface, and supply a set of extended functionality. The manager code if fully position independent and can be relocated at run-time if required. It is likely that it can be supplied as object code.

4.
Any peripheral drivers which support the GPI (see below) can be integrated into SoC BIOS. These are built as a separate functional block to the SoC BIOS manager. The peripheral driver blocks includes all drivers to be included in SoC BIOS and so must be rebuilt when the included set of drivers is changed.

SoC BIOS is intended to function with both polling and interrupt-driven drivers.

These are considered Physical Device Drivers (PDDs) in that they directly control the hardware registers. Functionality is likely to include initialisation and control functions and servicing interrupts to transmit or receive a data buffer. It is anticipated that a driver will be OS-independent, with OS-specific features being added in a wrapping driver (OSD) which adheres to the desired OS model.

SoC BIOS may access any peripheral to perform a number of generic functions that are (potentially) applicable to all peripheral types. The system used is termed the Generic Peripheral Interface (GPI).

The GPI is a layer of functionality that is added to a driver to allow that driver to interact with the BIOS. In general, the GPI offers a standardised interface that will support functionality that already exists in the driver.

The GPI consists of the functions below. It is not necessary for a driver to implement all of the GPI functions, but there is a dependency tree as shown below. For example, if a driver implements the GPI Self Test function it should also implement the Initialize and Get Memory Requirements functions.

Figure 8:
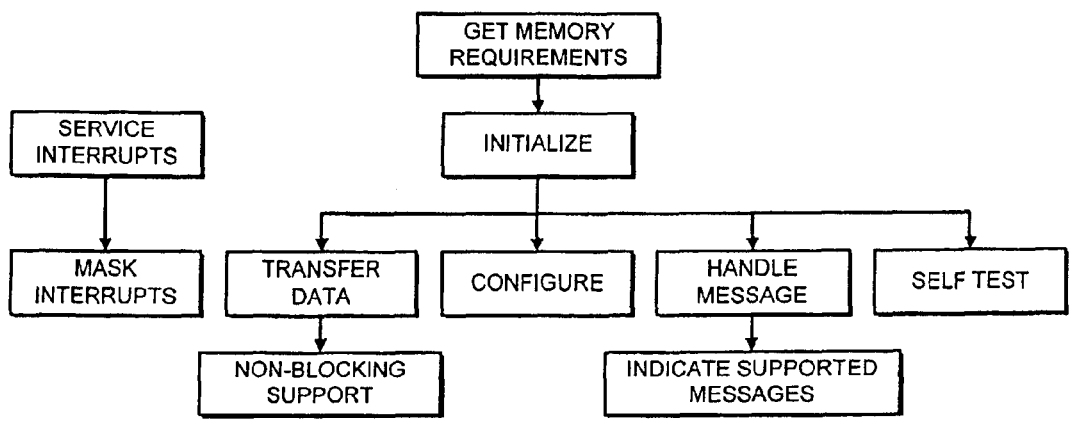

See FIG. 8—GPI Functions

Under GPI, peripherals are identified by a file name built from the driver type name and user-specified number (for example 'UART100'). The number is specified in the system description and may be arbitrary or may reflect the location of the peripheral in the system or the target to which it is attached.

SoC BIOS can send generic messages to peripherals by using the tagging and messaging system of GPI. The application may tag and untag all peripherals, one class of peripheral or one peripheral and messages will be distributed to all tagged peripherals.

This system allows generic code to be written which is not dependent on precise system configuration. For example, during data transfer, other peripherals may not be required, and the following commands might be sent:

Tag all peripherals
Untag the current output stream
Send 'power save' message

A designated 'supervisor' peripheral may be assigned. This will be notified of all messages and their targets. It may intervene to handle messages itself, either in addition to, or instead of, the driver function. For example, on a system with no power controller, 'power save' messages would be passed to the drivers. By declaring a power controller in the system description, the messages would automatically be handled there instead.

The driver may include a self test function. A number of different levels of test may be supported. The areas tested will depend on the peripheral, but a basic self test will probably not extend beyond writing to, and reading from, certain registers.

The self test function will be executed for each peripheral after initialisation. If the peripheral fails self test, it will be marked as unavailable to the system and not used.

The driver API will be made public to the application, should the application wish to access the driver directly, rather than through standard I/O. This is intended to allow peripheral-specific functions to be used, such as setting data transfer parameters. It is not intended that standard I/O and direct driver API I/O be used in parallel for data transfer from the same peripheral and results will be unpredictable.

SoC BIOS Linking

When building development software to use on a SoC BIOS system, the software links against a library in which BIOS or peripheral API calls are replaced by stub functions. These use a SWI mechanism to pass function identifiers to the BIOS.

The SoC BIOS build can remain system-resident and need not be rebuilt with the application The application will run with any build of the SoC BIOS, which would not be the case if directly linked to a pre-built BIOS.

SoC BIOS can itself access GPI functions for the peripheral drivers.

Extensibility is straightforward. StubIDs not handled by SoC BIOS directly are passed to extension systems (see §0) for management.

By routing all calls through one location, tracing and debugging possibilities become available.

The basic stub handling is as below. The stub handler handles StubID calls from SoC BIOS stubs, matching these against routines in a lookup table built into the code.

Figure 9:
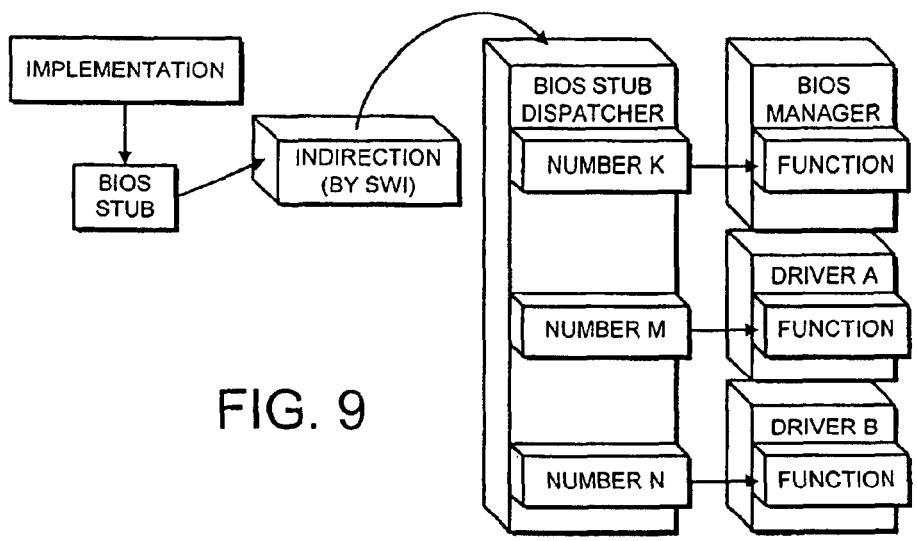

See FIG. 9—SoC BIOS Stub Handling

When generating the final executable, the system configuration will be fully specified. However, when working on a development system, it is anticipated that the basic configuration may be extended.

A SoC BIOS system specification may specify a number of Expansion Link Addresses (ELA). On initialisation, the SoC BIOS code will examine each of these locations, looking for an identification pattern indicating the start of a data block. If the pattern is present at this address, it will be taken as confirmation that the following is a valid SoC BIOS extension area.

A valid SoC BIOS extension will reflect the addition of extra peripheral hardware, and will, include a peripheral data block (PDB) and possibly a stub lookup table (SLT) to add further drivers.

Figure 10:
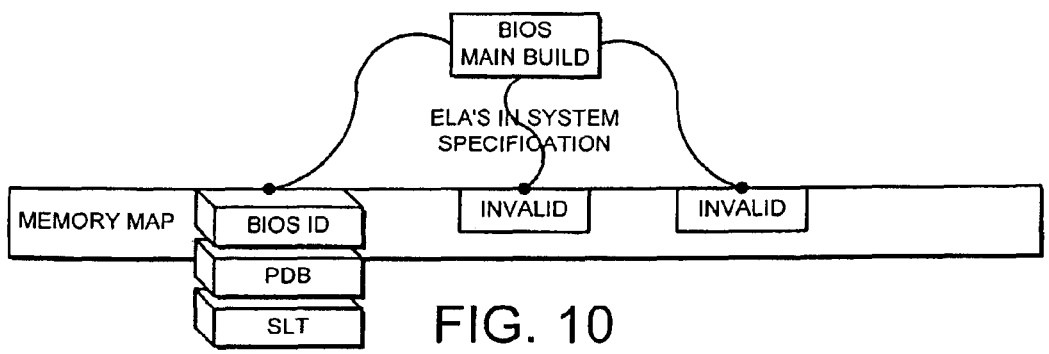

See FIG. 10—Accessing Modules with SoC BIOS ELAs

At run-time, the BIOS will direct stub calls to the drivers built into the BIOS, or to the extension areas, as appropriate. The ELAs allow further peripherals to be fully integrated into the BIOS.

Figure 11:
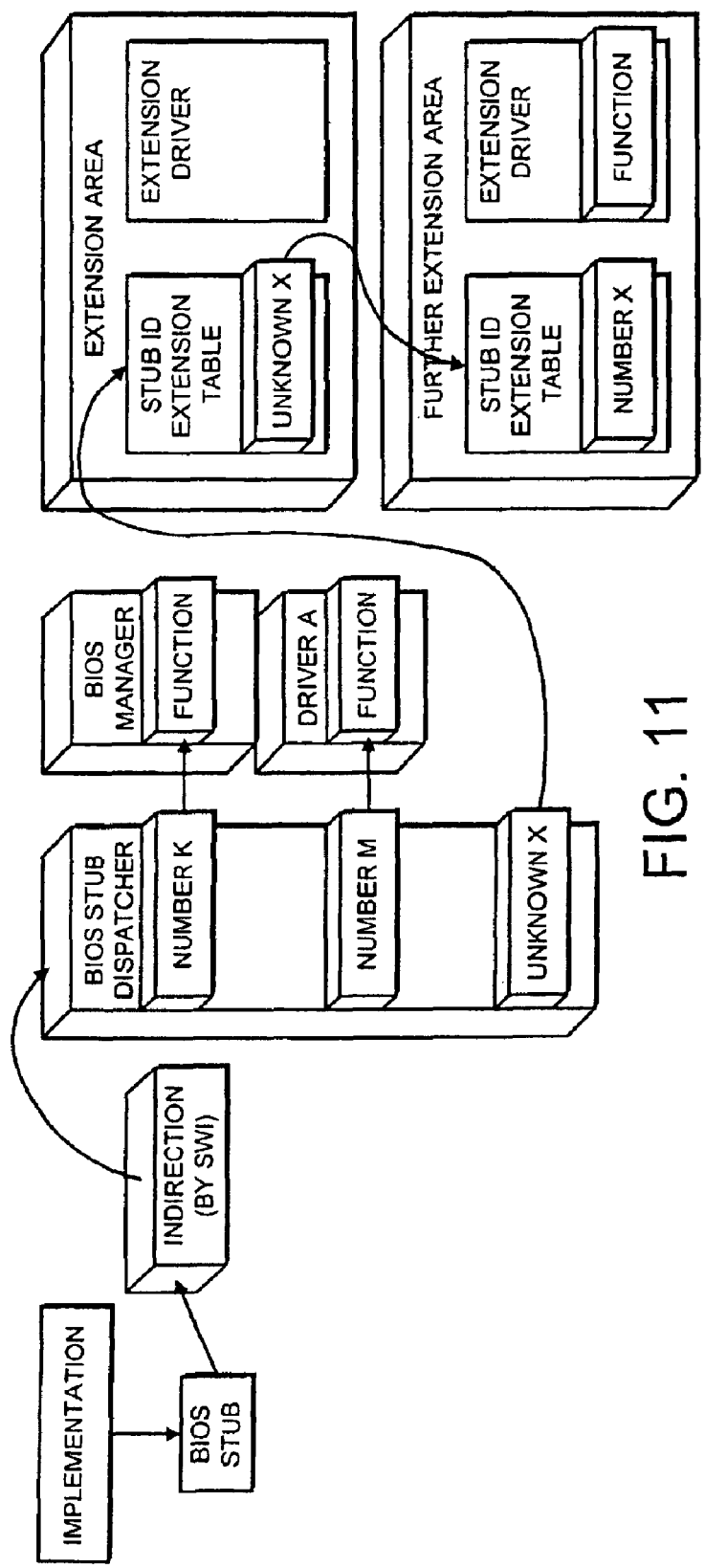

See FIG. 11—Passing Calls to Extension Drivers

SoC BIOS ('microBIOS') is an ARM solution to support I/O and abstraction in a flexible manner, so simplifying porting between platforms and reducing time to market.

This document describes the SoC BIOS run-time data encoding. The SoC BIOS encodes a system description as data, which is retrieved The BIOS (basic input/output system) is the program a microprocessor uses to get the computer started after you turn it on. It also manages the data flow between the computer's operating system and attached peripheral devices. [source - Intel]

SoC BIOS ('microBIOS')is an ARM solution to support peripheral input and output (I/O) and abstraction in a flexible manner, so simplifying porting between platforms and reducing time-to-market.

This document specifies the encoding used for the SoC BIOS system configuration data. This data is at runtime to identify and configure features of the system being used.

Each system will be specified by a set of data in a defined structure.

This will be produced and stored in a human-readable text form (initially by hand, but later by a software tool).

The format currently chosen is the telecommunications standard ASN.1, using ASN.1 'value rotation' to describe each system—this may later change, and there has been a proposal to move XML format. This will be reviewed later in the project.

The human-readable data is then encoded into a machine-readable form for access by the BIOS.

The Basic Encoding Rules (BER) of ASN.1 define an encoding format for data defined within ASN.1.

SoC BIOS will use a modified form of this encoding, to allow for the limited requirements of the BIOS data.

BER uses a TLV (Type, Length and Value) encoding system, where each element is encoded with an identifying type, and indication of the length of the element, and then the element value. This value may consist of nested TLV sets (for 'constructed' types). This system is ideal for partial decoding, allowing access functions to retrieve and return a single element from the encoding block with relative ease. The decoder in SoC BIOS can locate the elements and return them on request by access functions, avoiding the need for assigning space to decode the entire block (which is the usual method used with ASN.1 encoding).

The Type and Length encoding used will be more compact than for BER, since type checking will not be required.

The top bit of each byte will be an 'extension' bit, indicating that at least one further byte of length encoding data remains.

The second highest bit of the first byte (only) will indicate that this item is a sequence which will contain other elements.

The remaining six bits of the first byte and seven bit of following bytes are concatenated to form the length value. The first byte represents the highest bits. An example is in See Figure, which represents a sequence of length 0011111001011 (binary or 1995 bytes.

Figure 12:
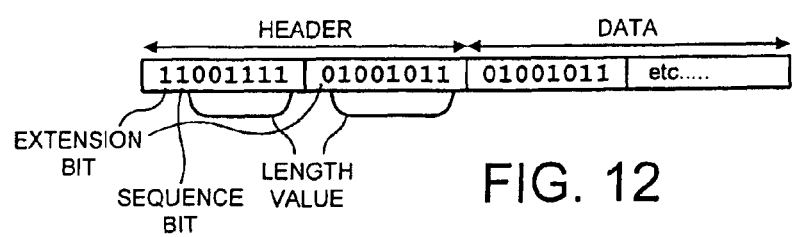

See FIG. 12—Modified BER Encoding

SoC BIOS will retrieve all encoded data as word accesses, so avoiding issues of byte endian-ness.

ASN.1 encodes data as byte sequences. It requires that the most significant byte of INTEGER values be transmitted first.

Within SoC BIOS, the first bytes are always encoded into, and retrieved from, the lowest bytes of the encoded word (little-endian).

SoC BIOS is defined to offer four possible formats of encryption of the specification data. The final product may support any one or more of these formats.

In this format, the data is encoded as described earlier.

Since the plain format leaves ASCII characters unchanged, the encoded data can be read using a debugger. The obscured data will modify this by applying a simple bit operation to each data word.

This format is intended to offer a simple encryption on a word-by-word basis. It has not yet been defined.

This format is intended to offer an improved encryption in two word blocks.

The TEA algorithm will probably be used. This encodes 64 bit data using a 128 bit key and source code for encryption and decryption is publicly available.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of setting up configuration program software for an integrated circuit having a plurality of fixed-configuration data processing circuit elements and a configuration memory storing configuration data describing said plurality of fixed-configuration data processing elements, comprising:

(i) upon an initialization of said integrated circuit, reading said configuration data from said configuration memory;

(ii) determining from said configuration data, configuration parameters of said integrated circuit for setting up said configuration program software to enable control of interaction between application program software and said plurality of fixed configuration data processing circuit elements.

2. A computer program storage medium storing a computer program for controlling an integrated circuit to perform a method as claimed in claim 1.

3. A method of forming configuration data for configuring an integrated circuit as claimed in claim 1, said method of forming configuration data comprising the steps of:

(i) generating a human readable hierarchical description; and (ii) automatically mapping said human readable hierarchical description into said configuration data.

4. A method as claimed in claim 3, further comprising the step of encrypting said configuration data prior to storing said configuration data in said configuration memory.

5. A computer program storage medium storing a computer program for controlling an integrated circuit to perform a method as claimed in claim 3.

* * * * *